Jan. 16, 1945.　　　　　K. PRINS　　　　　2,367,609
LOADING STATION FOR ENDLESS CONVEYERS
Filed April 30, 1943　　　2 Sheets-Sheet 2
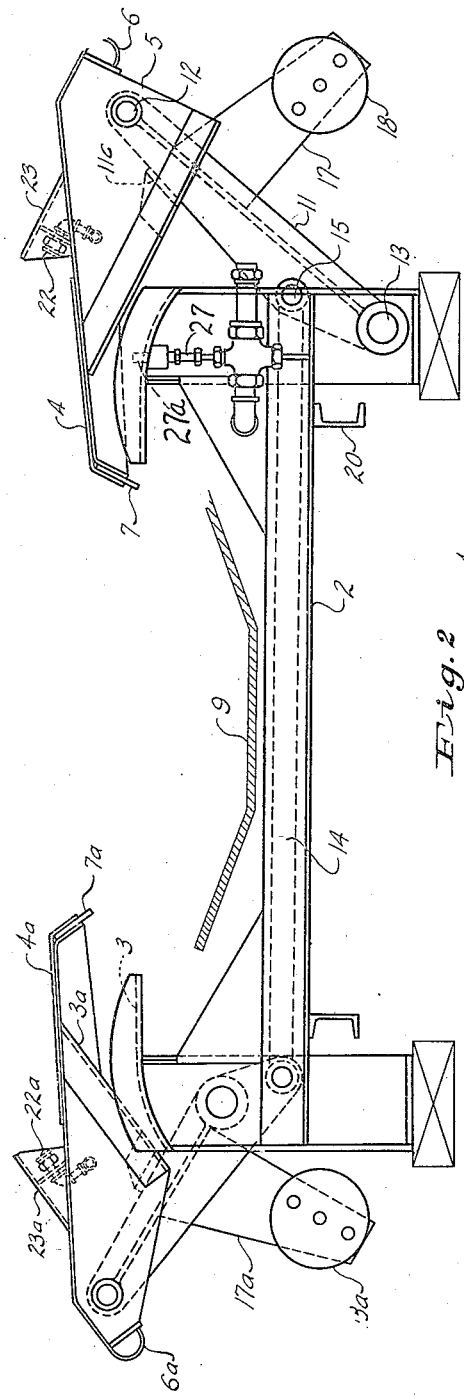
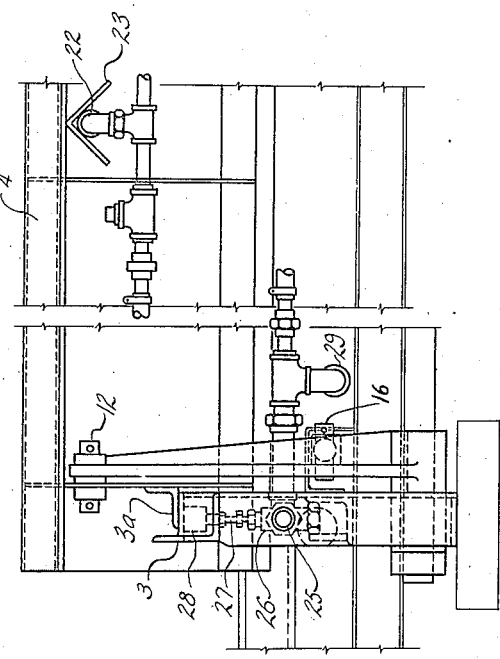
INVENTOR.
Klaas Prins
BY William B. Jaspert
Attorney.

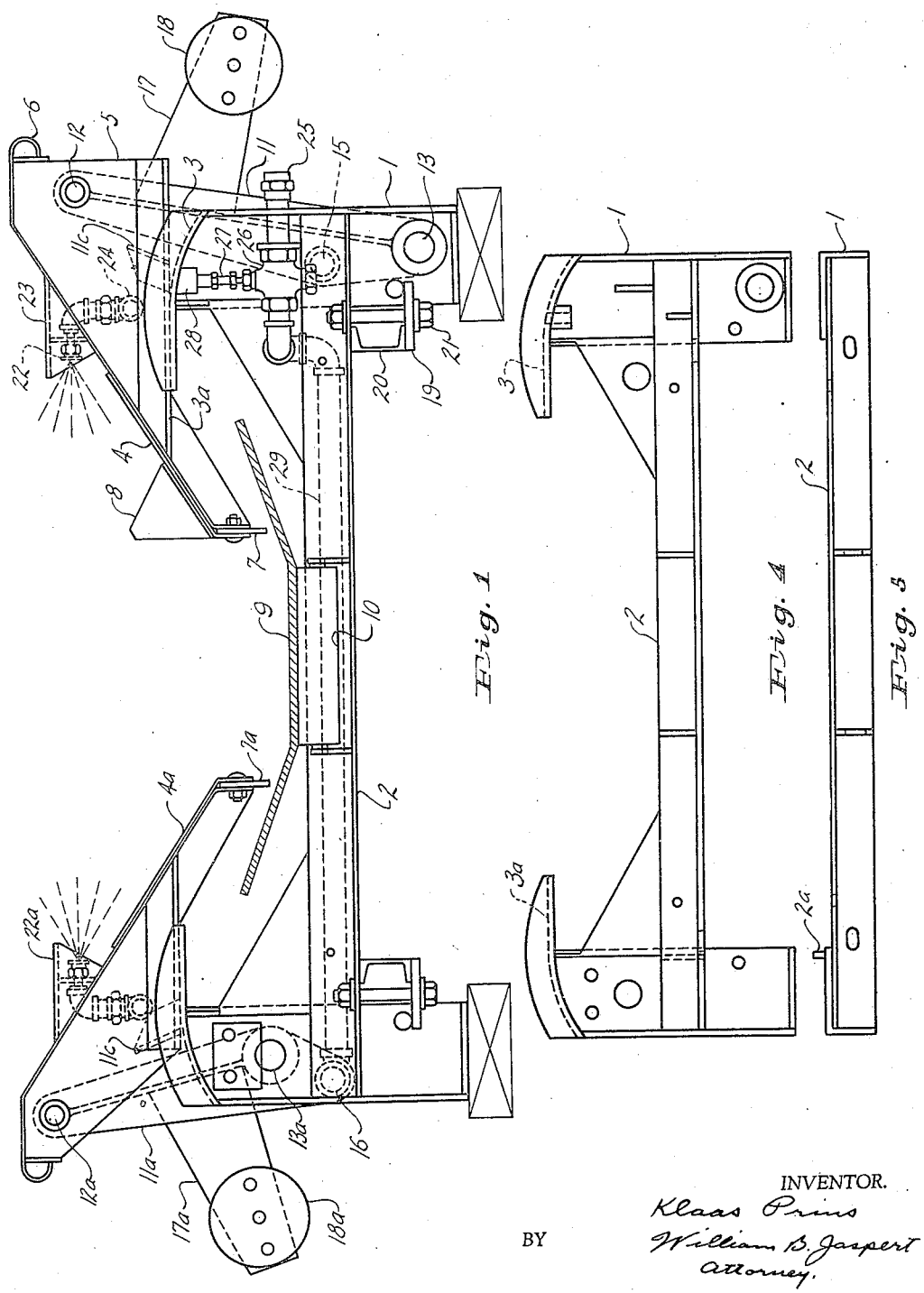

Patented Jan. 16, 1945

2,367,609

UNITED STATES PATENT OFFICE 2,367,609

LOADING STATION FOR ENDLESS CONVEYERS

Klaas Prins, Mount Lebanon, Pa.

Application April 30, 1943, Serial No. 485,219

8 Claims. (Cl. 198—52)

This invention relates to new and useful improvements in dumping stations for loading conveyer belts or the like, and it is among the objects thereof to provide means operable by the materials delivery truck or vehicle for adjusting the dumping station equipment to center the material on the conveyer belt and to automatically clear the equipment of the belt to eliminate interference with materials dumped at other stations when the loading equipment is backed away.

Another object of the invention is the provision of loading equipment or stations for endless conveyer belts which is adapted to be controlled by contact with the materials conveying truck to adjust the loading of the materials on the conveyer to any desired width from opposite sides, and to center the load on the conveyer over an area of its width determined by the nature of the materials loaded thereon.

Another object of the invention is the provision in combination with materials loading and centering equipment of the above-designated character of means for spraying the material as it is being dumped on the conveyer belt by automatically connecting and disconnecting the sprays with a source of spraying liquid in the movement of the dumping mechanism to its operative and inoperative positions.

Still a further object of the invention is the provision of a materials dumping and centering equipment of simple compact and durable mechanical construction, to be especially adapted for use in restricted areas such as coal mines, the equipment being constructed of a minimum number of parts and designed to facilitate the take-down and erection at various dumping positions of the conveying system.

The invention will become more apparent from a consideration of the accompanying drawings constituting a part hereof in which like reference characters designate like parts and in which:

Fig. 1 is a side elevational view of a materials dumping and conveyer loading device embodying the principles of this invention shown in its operative position;

Fig. 2 a similar view of the mechanism in its inoperative position with some of the elements deleted for the sake of clarity;

Fig. 3 a side elevation of a portion of the dump apron;

Fig. 4 a side elevational view of an end frame member; and

Fig. 5 a top plan view thereof.

As shown in Fig. 2, the device consists of end frames 1 having transverse connecting frames 2, the upright 1 having the curved guide bracket or shoe 3 on which the dumping apron 4 is supported.

The apron 4 may be of any suitable length to provide a dumping area corresponding to the unloading space of the dump truck or shuttle cars. In actual use for loading coal mine conveyers, the aprons have been constructed of 8-foot lengths. Two or more sets of the frames 1 and 2 are employed to support the aprons at the respective ends and at some intermediate point if desired to form a strong materials receiving station which in the loading of coal in mines must be capable of handling lumps of two to three ft. dimension.

The aprons are provided with side walls 5, having a bumper 6 at the top thereof for receiving the impact of the coal loading truck or other delivery equipment which is used to manipulate the dumping and centering device as will be hereinafter described. Secured to the end of the apron is a centering bar 7 and guide angles 8 are fastened on the apron to guide the material so as to prevent its falling off the side of the apron.

As shown in Figs. 1 and 2, the dumping aprons 4 have two positions, the aprons being shown in the loading position in Fig. 1 and in the inoperative position in Fig. 2 with respect to a belt conveyer 9 which is supported by the usual rollers 10, Fig. 1, the inclination of the edges of the belt being maintained in the conventional manner by side rolls not shown. The dumping aprons 4 are supported on the arcuate guide surfaces 3 by angle bars 3a and are movable to the operative and inoperative positions by levers 11 and 11a pivoted to the sidewalls 5 of the aprons at 12 and 12a. Lever 11 is pivoted to the upright 1 at 13 and lever 11a is pivoted to its upright at 13a. Levers 11 and 11a are connected by a link 14 to be simultaneously movable, the links being connected to lever 11 at 15 and lever 11a at 16. The levers 11 and 11a rest against seating bars 11c, that are secured to the aprons 4, when the latter are biased to the non-loading position shown in Fig. 2. The pin 16 of link 14 abuts against stops 2a, Fig. 5, when the aprons are in unloading position.

It is to be noted that the arms of levers 11 and 11a are of different lengths and they are so proportioned as to effect movement of the aprons 4 and 4a through substantially the same arc. Levers 11 and 11a are provided with arms 17 and 17a carrying counterweights 18 and 18a. The system of levers and counterweights function to normally bias the aprons 4 to the open position as shown in Fig. 2, and the aprons are moved to the operative position of Fig. 1 by the loading vehicle contacting the bumper 6 of either apron to push it to the seating position of the bar 3a on the arcuate supports 3, the loading vehicle maintaining its position during the unloading of the material to the dumping aprons, thereby holding the aprons in the position of Fig. 1.

As shown in Fig. 1, the upright frames 1 are provided with clamps 19 for securing to longitudinal members 20 of the belt conveyer frame, the frames 20 being secured by bolts 21 which are readily assembled or removed to facilitate the take-down or erection of a dumping station along any point of the belt conveying system, it being customary in mines to use a number of such dumping stations to feed a conveying belt which may be several thousand feet in length.

As shown in Fig. 1, the dumping aprons are provided with spray nozzles 22 which are disposed under protective angles or hoods 23 fastened to the dumping aprons, as is more clearly shown in Fig. 3 of the drawings. The nozzles 22 are connected through piping 24 to a source of spraying fluid such as water, the intake end of the system being designated by the numeral 25. A valve 26 is provided to control the flow of the fluid to the sprays, the valve having a stem 27 normally biased to the closed position, the stem being provided with a plunger disposed in a boss 28 at the lower end of the arcuate support 3, the plunger extending through the supporting member 3, as shown in Fig. 2, to be engaged by the bar 3a of the apron structure when it is moved to its seating or operative position of Fig. 1.

When plunger 27 is depressed, valve 26 opens and the spraying liquid is emitted from the nozzles 22 to settle the dust raised by the dumping coal which would be dangerous to safe mining operations.

Where the dumping station is used for loading other materials, other spraying fluids, such as chemicals, may be employed for other than dust-settling purposes.

As shown in Figs. 1 and 3, the sprays of the respective aprons are connected by the pipe line 29 disposed in the cross-frame 2.

The operation of the above described dumping and conveyer loading mechanism is briefly as follows:

With the dumping aprons 4 and 4a in the position shown in Fig. 2, the loading truck which in modern coal mines consists of rubber tired equipment are brought in contact with the bumper 6 of one of the aprons and pushes the apron forward to bring it to the desired position over the conveyer belt, which is normally the position of Fig. 1, with the apron bar 3a seated on the arcuate guide 3. In this position the centering bars 7 and 7a have a normal spacing which determines the loading of the material on the belt, the material remaining centered on the belt after it assumes its angle of repose when it is conveyed beyond the dumping station.

If a large lump of coal of a dimension larger than the space between the centering bars 7 and 7a is dumped on the apron 4, it will not strike the conveyer belt that will be spanned across the aprons. The operator then backs off the loading truck, causing the aprons to draw back or separate and slowly lower the lump of coal on the conveyer belt.

The aprons are then again brought to their normal loading position by forward movement of the loading truck. When the truck has been unloaded, the operator backs away and the counterweights 18 and 18a will return the aprons to their inoperative position, in which position the centering bars 7 and 7a will clear the conveyer belt and any material that may be passing on the belt from another loading station.

It is evident from the foregoing description of this invention that materials dumping stations for endless conveyers made in accordance therewith are especially suited for loading coal in mines but may obviously be employed in other industrial fields. The equipment requires no source of power as the loading truck is the prime mover for swinging it to the operative dumping position and for manipulating the aprons for loading large lumps when such are dumped.

The apparatus also automatically turns on and shuts off the spray and therefore requires no attention in its normal use.

It is designed to be compact and the lever linkage and spraying equipment is mounted in protective housings and in the transverse angles or channels of the structure. There are relatively few parts which may be readily dismembered or assembled to facilitate its use at different intersections of mines without interfering with the normal use of the conveying equipment.

Although one embodiment of the invention has been herein illustrated and described, it will be evident to those skilled in the art that various modifications may be made in the details of construction without departing from the principles herein set forth.

I claim:

1. A loading device for an endless conveyer comprising a support at a side of the conveyer, an apron mounted on said support for movement toward and away from the conveyer, said support having a seat for said apron when in loading position, and means normally biasing said apron away from its seating support, said apron being movable by a loading vehicle to the loading position over the conveyer.

2. A loading device for an endless conveyer comprising a support at each side of the conveyer, an apron pivotally mounted on each support and adapted to seat on an abutment of the support, means including a system of levers and mechanical linkage responsive to a pushing force on one of said aprons for centering said aprons over the conveyer, and means for returning said aprons to their non-loading positions to clear the conveyer when the pushing force is removed.

3. A loading device for an endless conveyer comprising an upright at each side of the conveyer connected by a cross-frame to constitute a rigid support, an apron movably mounted on each of the uprights having a system of levers and links supporting and connecting said aprons for imparting simultaneous movement to and from the conveyer, said uprights having supporting abutments on which the aprons seat in their loading position and said levers having counterweights for normally holding the aprons in their unloading position clear of the conveyer, said aprons being movable to loading position by engagement of a loading vehicle with either of the aprons to push the same towards the loading position.

4. A loading device for an endless conveyer comprising a supporting frame extending below and on opposite sides of the conveyer, loading aprons pivotally mounted on opposite sides of the supporting frame to be movable through substantially similar arcs above and towards the center of the conveyer, means connecting said aprons to render them simultaneously movable, means associated with said connecting means normally holding said aprons in their unloading position away from the conveyer, guides on said aprons forming a channel over the conveyer in the loading position of the aprons to center the load on the conveyer, the width of the channel being determined by the position of the aprons, said aprons being movable to their loading position by abutting contact with a loading vehicle.

5. A loading device for an endless conveyer comprising a supporting frame extending beneath the conveyer to the opposite sides thereof, a plurality of aprons movably mounted to be inclined towards the conveyer in their loading position, said aprons being mounted on a plurality of levers having a connecting link and having counterweights to normally lift the aprons clear of the conveyer, the supporting frame having seating abutments for said aprons, and a stop in the path of movement of the connecting link for limiting the movement of said levers.

6. A loading device for an endless conveyer comprising a support on each side of the conveyer, a loading apron mounted on each of said supports and adapted to seat on said supports in their loading positions, levers pivoted to said apron and to said apron supports, a link connecting said levers to render the aprons simultaneously movable and counterweights on said levers for normally lifting the aprons from their seating supports, the lever of one of said aprons being of a smaller dimension than the lever of the other of said aprons with the arms thereof so proportioned that the apron carried by the short lever will move through substantially the same arc as the other of said aprons.

7. A loading device for an endless conveyer comprising a plurality of uprights at each side of the conveyer, cross-frames connecting said uprights beneath the conveyer and longitudinal supporting frames attached to the uprights to constitute the support a unit assembly that is readily dismembered and transportable for use along the endless conveyer, a plurality of loading aprons extending across said uprights, one on each side of the conveyer and adapted to seat on said supports in their loading position, a plurality of levers pivoted to the supports and to said aprons, links connecting the levers to render the aprons simultaneously movable, counterweights for said levers to normally bias the aprons to their unloading position away from the conveyer, said aprons having guide bars for centering the load on the conveyer and being further provided with guide means for guiding the material when it is dumped on the loading aprons.

8. A loading device as set forth in claim 7 provided with spraying means mounted on the apron connected to a source of liquid, and control valves for engagement by said aprons operable in response to movement of the aprons to their loading position to connect the sprays with the source of liquid supply.

KLAAS PRINS.